(12) United States Patent
Singh et al.

(10) Patent No.: US 6,200,919 B1
(45) Date of Patent: *Mar. 13, 2001

(54) ALUMINO-SILICATE DERIVATIVES

(75) Inventors: Balbir Singh, St. Lucia; Ian Donald Richard MacKinnon, Ellengrove; David Page, Corinda, all of (AU)

(73) Assignee: The University of Queensland, Queensland (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/817,367

(22) PCT Filed: Oct. 23, 1995

(86) PCT No.: PCT/AU95/00698

§ 371 Date: Apr. 14, 1997

§ 102(e) Date: Apr. 14, 1997

(87) PCT Pub. No.: WO96/18576

PCT Pub. Date: Jun. 20, 1996

(30) Foreign Application Priority Data

Dec. 16, 1994 (AU) .................................................. PN0121

(51) Int. Cl.⁷ ...................................................... B01J 21/16
(52) U.S. Cl. ................................. 502/84; 502/60; 502/86; 502/64; 502/80; 502/85; 501/141; 423/328.1
(58) Field of Search .................................. 502/60, 80, 64, 502/84, 85, 86; 106/486, 487; 501/141; 423/328.1

(56) References Cited

U.S. PATENT DOCUMENTS

| 3,140,251 | * | 7/1964 | Plank et al. ............................. 502/79 |
| 3,976,598 | | 8/1976 | Daviditz . | |
| 4,271,043 | * | 6/1981 | Vaughan et al. ....................... 502/84 |

FOREIGN PATENT DOCUMENTS

| 917630 | 12/1972 | (CA) . |
| 499887 | 3/1976 | (RU) . |
| WO 95/00441 | 1/1995 | (WO) . |

OTHER PUBLICATIONS

"Data Handbook for Clay Materials and Other Non–Metallic Minerals," H. van Olphen, Ed., Pergamon Press, pp. 19 & 22 (1979).

M. H. Battey, "Mineralogy for Students," Department of Geology, Univ. of Newcastle upon Tyne, Longman, Publ. P. 237 (Year Unknown).

* cited by examiner

*Primary Examiner*—Tom Dunn
(74) *Attorney, Agent, or Firm*—Akin, Gump, Strauss, Hauer & Feld, L.L.P.

(57) ABSTRACT

The formation of new materials in the form of alumino-silicate derivatives from 2:1 layer clay materials which are obtained by the chemical modification of 2:1 layer clay minerals by reaction with a salt having the formula MX wherein M is ammonium ion or alkali metal cation and X is a halide. The new materials have the following characteristics: (a) an amorphous x-ray diffraction signal manifest as a broad hump using x-ray powder diffraction between 22° and 32° 2θ using CuKα radiation; and (b) the presence of primarily tetrahedrally coordinated aluminum.

14 Claims, 4 Drawing Sheets

ALUMINO-SILICATE DERIVATIVES

CROSS-REFERENCE TO RELATED APPLICATION

This application is a 35 U.S.C. § 371 filing of International Application No. PCT/AU95/00698, filed Oct. 23, 1995.

FIELD OF THE INVENTION

THIS INVENTION relates to the formation of new materials in the form of alumino-silicate derivatives from 2:1 clay minerals as hereinafter described and processes to form these new materials which are obtained by the chemical modification of 2:1 clay minerals.

The derivatives of these layer minerals are characterised by a predominance of tetrahedrally-coordinated $Al^{+3}$ which has resulted from the chemical modification of octahedrally-coordinated $Al^{+3}$ in the parent mineral. This atomic-scale transformation makes available a higher number of exchangeable sites than would be normally available in the original clay structure.

BACKGROUND OF THE INVENTION

Two features of the new materials which may result from the chemical modification of these 2:1 clay minerals are an enhanced capacity to exchange cations from solution (i.e. a cation exchange capacity) and/or an increase in the available surface area when compared with the properties of the initial starting mineral. These two features are of considerable significance to the cost-effective use of these derivative materials in a wide range of applications for cation-exchange (e.g. for removal of toxic metal ions from aqueous and non-aqueous solutions; removal of $NH_4^+$ from aqueous and non-aqueous solutions, as detergent builders and as water softeners), absorption (e.g. for the removal of gases from the environment, for absorption of cations from solutions), as agents for the controlled release of desired cations into an environment and as substrates for catalysis reactions in the modification of hydrocarbons and other chemicals.

Clay minerals are part of the larger family of minerals called phyllosilicates—or "layer" silicates. These clay minerals are typically characterised by two-dimensional arrangements of tetrahedral and octahedral sheets, each with specific elemental compositions and crystallographic relationships which define the mineral group. Thus, the tetrahedral sheet may have the composition $T_2O_5$ (where T, the tetrahedral cation, is Si, Al and/or Fe) and the octahedral sheet may commonly contain cations such as Mg, Al and Fe, but may also contain other elements such as Li, Ti, V, Cr, Mn, Co, Ni, Cu and Zn (Brindley and Brown, Crystal Structures of Clay Minerals and their x-ray identification, Editors G. W. Brindley and G. Brown, Mineralogical Society, London, 1980). Each of these clay mineral groups can be further classified into trioctahedral and dioctahedral varieties, depending on the occupancy of the octahedra in the respective sheet arrangement(s). Some specific mineral species may show cation occupancies which are intermediate between the two varieties. Nevertheless, the relative arrangement of these tetrahedral and octahedral sheets also defines the basic mineral groups in that an assemblage which links one tetrahedral sheet with an octahedral sheet is known as a 1:1 type mineral. An assemblage which links two tetrahedral sheets with one octahedral sheet is known as a 2:1 mineral. This basic classification of mineral species, based upon the crystallographic relationships of specific sub-units, is well-known to those skilled in the art of clay mineralogy and forms a basis for description of this invention.

The production of an amorphous derivative, termed "kaolin amorphous derivative" (KAD), from kaolin clays which are 1:1 alumino-silicates, has been described in an earlier disclosure (WO95/00441). We have now surprisingly found that an amorphous derivative can also be manufactured from 2:1 clays which include montmorillonites and other members of the smectite group. The production of an amorphous derivative from these 2:1 clays is surprising insofar as the structure and chemistry of these minerals is markedly different to that of the 1:1 kaolin group minerals. A unit layer of the clays in the kaolin group consists of one octahedral sheet and one tetrahedral sheet so that both sheets are exposed to the interlayer space, a region which is accessible to reacting species. However, a 2:1 clay mineral comprises one octahedral sheet and two tetrahedral sheets. The octahedral sheet, which contains octahedrally coordinated aluminium, is sandwiched between the tetrahedral sheets. The transformation of this octahedral sheet is not readily predictable using metal halides since the interlayer space is surrounded by tetrahedral sheets. It is also relevant to point out that the octahedral sheet in 2:1 clay minerals would not be readily accessible to metal halides. It would be assumed by those skilled in the art that reacting species with 2:1 clay minerals would provide different products to reaction products described in WO95/00441 for these reasons.

SUMMARY OF THE INVENTION

It is therefore an object of the invention to provide the abovementioned modified 2:1 clay minerals possessing the two features discussed above.

In one aspect, the invention provides modified 2:1 clay minerals by a process using a metal halide which may react with a 2:1 clay mineral or combination of 2:1 clay minerals to provide a modified 2:1 clay mineral which includes the two features described above.

Examples of 2:1 clay minerals which may be modified by the process(es) of the invention include montmorillonite, illite, palygorskite and saponite. The 2:1 layer clay mineral derivatives of the invention are characterised by predominant tetrahedral $Al^{+3}$ and for the sake of convenience, are hereinafter termed "alumino-silicate derivatives" or "ASDs". In the case of, e.g. montmorillonite clays, the octahedral Al within the parent (i.e. clay) has been transformed to tetrahedral co-ordination. Further elucidation of this ASD, henceforth designated M-ASD, where M is the exchanged cation obtained by the specific formation process, can be obtained by conventional mineral characterisation techniques which demonstrate the following properties:

(1) an "amorphous" nature (to X-ray diffraction), i.e. without any apparent long range order of the repeat units;
(2) an enhanced capacity to exchange cations (compared with the original starting mineral) from solution;
(3) an increase in the available surface area of the material (compared with the original starting mineral) as measured by the conventional BET isotherm;
(4) an enhanced capacity compared to the original starting material to adsorb anionic species or complex polyanions from solution; and/or
(5) an enhanced capacity compared with the original starting material to absorb oil and/or organic molecules.

In relation to property (2), this may be exemplified by the ASDs of the invention having a cation exchange capacity of 20–900 milli-equivalents per 100 g as measured by exchange of ammonium or metal cations from an aqueous solution. Most preferably the cation exchange capacity as measured by exchange of ammonium is between about 300–450 milli-equivalents per 100 g.

In relation to property (3), this may be exemplified by the ASDs of the invention having a surface area less than 400 m$^2$/g as measured by the BET isotherm which is higher than the 2:1 clay mineral starting material. Most preferably the BET surface area is between 25 m$^2$/g and 200 m$^2$/g.

Properties (4) and (5) are demonstrated in International Application No PCT/AU95/00699 having the same international filing date as the present application.

DETAILED DESCRIPTION OF THE INVENTION

Figure 1:
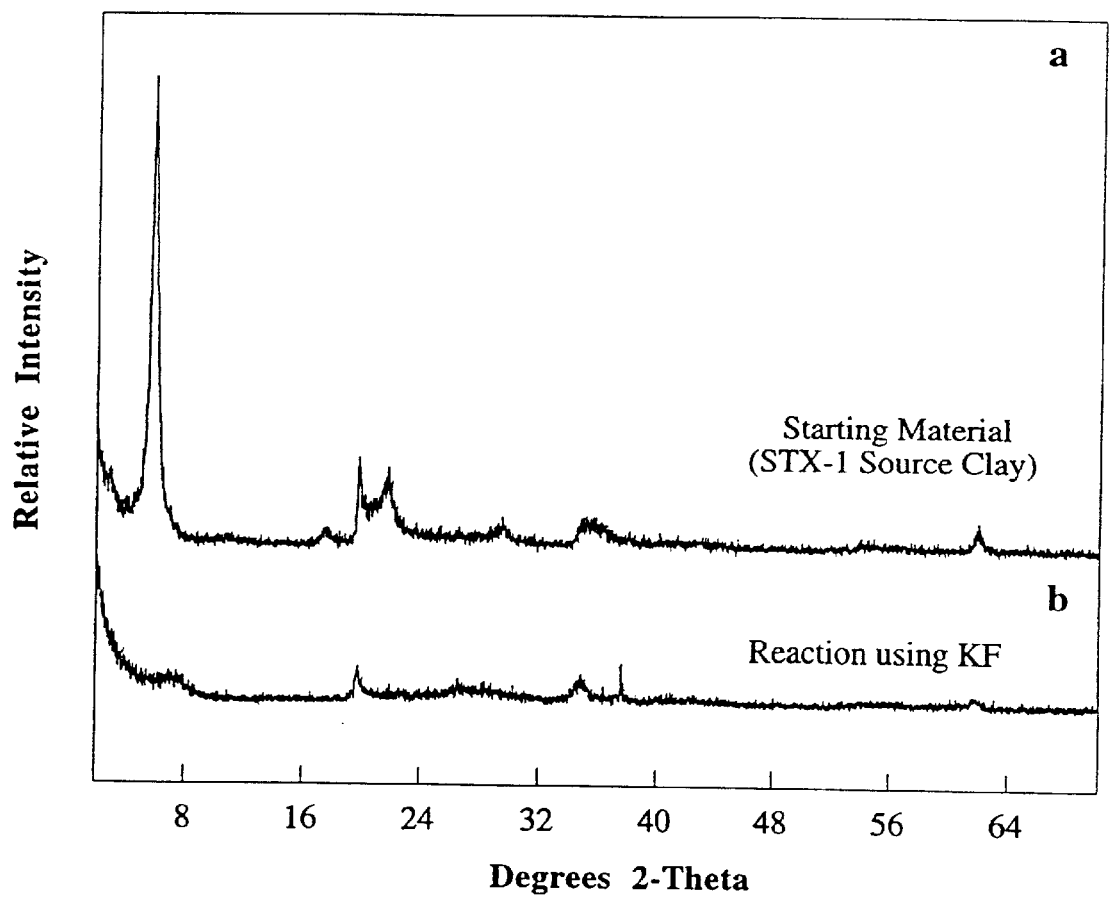
FIG. 1 Powder XRD patterns for (a) starting material Texas montmorillonite (STx-1) before reaction, and (b) product formed after reaction using KF (Example 1). For FIG. 1, detailed enlargements of the region between 20° and 35° 2θ are given in FIG. 2.

One form of the ASD of the invention has the chemical composition:

$$M_pAl_qSi_2O_r(OH)_sX_t \cdot uH_2O$$

where M is an exchangeable alkali metal cation, X is a halide, $0.2 \leq p \leq 2.0$, $5.0 \leq q \leq 2.5$, $4.0 \leq r \leq 12.0$, $0.5 \leq s \leq 4.0$, $0.0 \leq t \leq 1.0$ and $0.0 \leq u \leq 6.0$. In one specific form, the ASD may contain the element potassium, such that M=K.

In the ASD referred to above, it is possible to exchange, at least partly, the alkali metal cation with any cation which is stable in aqueous solution. Such exchange cations include other alkali metal cations, alkaline earth cations, transition metal cations, lanthanide and actinide cations, heavy metal cations and ammonium. While exchange does not proceed to completion for all cations, there are many transition metal cations (e.g. Mn$^{2+}$, Cr$^{3+}$, Co$^{2+}$, Ni$^{2+}$, Cu$^{2+}$, Zn$^{2+}$, Ag$^+$), lanthanide cations (e.g. La$^{3+}$, Nd$^{3+}$), heavy metal cations (e.g. Pb$^{2+}$, Cd$^{2+}$, Hg$^{2+}$) and the actinide UO$^{2+}$ which do. For some cations exchange is complete after three hours at room temperature (e.g. Pb$^{2+}$, Cu$^{2+}$), while others require longer times and temperatures up to 110° C. (e.g. Zn$^{2+}$).

Preferably the cations NH$_4^+$, Na$^+$, K$^+$, Li$^+$, Rb$^{30}$ or Cs$^+$ is exchanged by Pb$^{2+}$, Cu$^{2+}$, Cd$^{2+}$, Ni$^{2+}$, Co$^{2+}$, Cr$^{3+}$, Sr$^{2+}$, Zn$^{2+}$, Nd$^{3+}$ or UO$_2^{2+}$.

Such cation exchange essentially preserves the XRD-amorphous character of the ASD. However, the specific surface of the exchanged materials, while still higher than that of the starting 2:1 mineral, does increase or decrease depending on the exchange cation.

For example, in the case of exchange of Cu$^{+2}$ from an aqueous solution, a new material, termed Cu-ASD, is formed and which, for example, shows a high surface area as measured by the conventional BET isotherm. To differentiate, in generic formulae, between new ASD materials formed directly via the transformation of a 2:1 clay mineral (as in Examples 1 and 2 below) and those ASD materials formed by cation exchange of the directly derived ASD, the following terminology is utilized in this document:

M-ASD denotes material directly formed via the general processes described in Examples 1 and 2

M$_c$-ASD denotes material subsequently formed via a cation exchange with M-ASD material. Descriptions of this type of material, and the methods used to obtain same, are given in Examples 3 and 4.

Clearly partially formed ASDs in which two cations occupy sites or in which multiple cations are exchanged via a series of partial reactions are possible forms of this new material.

Figure 2:
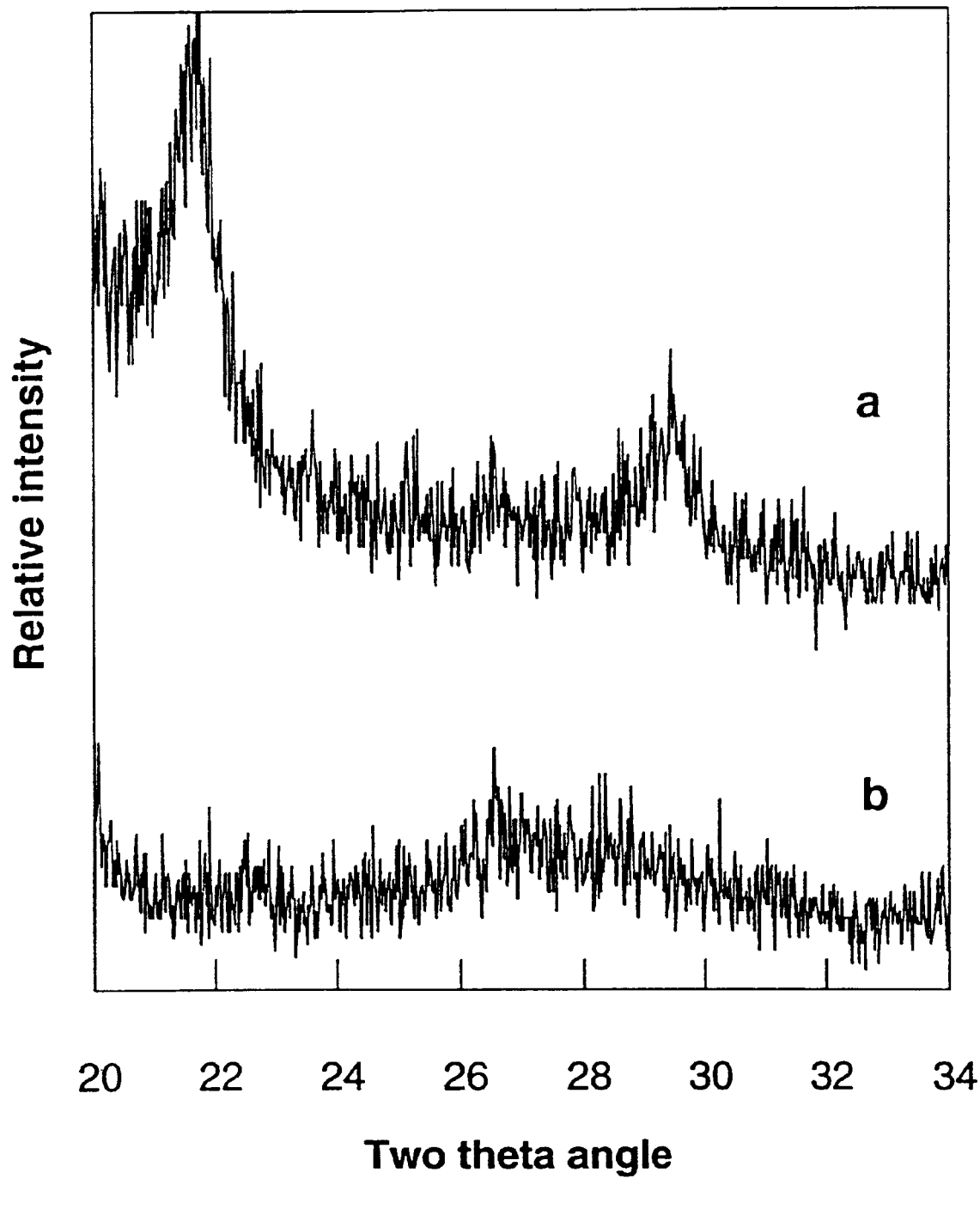
FIG. 2 Higher scale enlargements of powder XRD traces shown in FIG. 1 demonstrating the region between 20° and 35° 2θ. For FIG. 2d, corresponding to sample number STx-5 in Table 1, the presence of a broad "hump" between 22° and 32° 2θ is readily observed.

One of the primary crystallographic methods to define ASD material is powder X-ray diffraction (XRD). In the case of powder XRD, the formation of M-ASD as a primary component of the reaction is denoted by a loss of sharp diffraction peaks corresponding to the original starting mineral (e.g. Ca-montmorillonite) and a corresponding increase in intensity of a broad "hump" between 22° and 32° 2θ using CuKα radiation (see, for example, FIG. 1b, 2b). An example of a typical XRD pattern, for the starting montmorillonite (STx-1) and for the respective M-ASD material formed by the process of Example 1 is given in FIGS. 1a and 1b, respectively.

As is known by those skilled in the art, montmorillonites such as STx-1 and SWy-1 contain octahedrally-coordinated aluminium ions. This crystallographic feature can be demonstrated by a number of methods including recalculation of chemical analyses as mineral formulae and assignment of aluminium atoms to the octahedral sites in the montmorillonite structure.

It is well known to those skilled in mineralogy that conversion of octahedral Al to tetrahedrally co-ordinated Al results in positive charge deficit in the tetrahedral framework. However, this charge deficit in the anionic framework can be balanced by fixed or exchangeable cations (Na, K, Ca, Mg, etc.) seated in the available voids. This mechanism is precisely exemplified by natural phases such as feldspar, feldspathoids and zeolites, which contain varying proportions of tetrahedrally coordinated Al (Klein and Hurlbutt, Jr., Manual of Mineralogy, after J. D. Dana, John Wiley & Sons, New York, pp 446). These fundamental mineralogical principles are employed in this disclosure to ascertain the presence of tetrahedrally coordinated Al. It is clear from the chemical composition data referred to hereinafter that Al in ASD is tetrahedrally coordinated and consequence charge deficit is balanced by K or Na incorporated into the structure from the reactants. The incorporated cations are largely exchangeable as shown by cation exchange data referred to hereinafter which further demonstrates the tetrahedrally coordinated nature of Al in the disclosed material.

It is clear from the specific CEC data referred to hereinafter that a high number of exchangeable sites are available in the M-ASD. This is clear evidence that octahedrally coordinated aluminium has been convereted to tetrahedrally coordinated aluminium.

The above primary crystallographic and chemical techniques define the atomic arrangements of the critical elements in this new material and forms the basis of a family of mineral derivatives which have been obtained by the chemical reaction of 2:1 clay minerals. The essential crystallographic features are:

the transformation of long-range order to an "amorphous" structure showing a broad X-ray diffraction "hump", or peak, between 22° and 32° 2θ using CuKα radiation; and the presence of primarily tetrahedrally-coordinated aluminium.

Chemical analysis can be effected by a number of means, but in this disclosure, the use of an electron microprobe to quantify the amounts of elements with atomic number greater than 11 (i.e. Na or higher) is preferred. The presence of oxygen is determined according to general principles for microanalysis of minerals known to those skilled in the art. Depending on the nature of the reactant (i.e. the metal halide) an exchangeable cation, such as Na or K, will be present in the alumino-silicate derivative.

Bulk physical properties for these alumino-silicate derivatives, such as BET surface area, cation exchange capacity (CEC), oil absorption, degree of basicity etc., are influenced by the nature of the processing used to form the ASD. In another aspect of the invention, this relationship shows that specific ASDs may be more suited to one application (e.g. removal of trace amounts of divalent cation) than another (e.g. absorption of gases or oils) but that in relative comparison to the clay mineral used to form the ASDs, each ASD has properties more suited to the application than the clay.

The as-formed ASD, for example, via reaction with KF, will contain a high percentage of $K^+$ ions on the exchangeable sites of this new material. As shown in Examples 3 and 4, cations such as $Cu^{+2}$, Li— or $NH_4$ will readily exchange with the $K^+$ or $Na^+$ of these exchangeable sites in an M-ASD to form a Cu-rich, $Li^-$ or $NH_4^+$-rich derivative, respectively. In this instance, the Cu-ASD shows a high value for available surface area which, with suitable pre-treatment, enables use of this material, for example, as a catalyst for dehydrogenation reactions of organic compounds. Similarly, ammonium-exchanged ASD, or $NH_4$-ASD, has significant potential for use as a fertiliser or nutrient-provider in the agricultural, horticultural and feedstock industries. Alternatively, M-ASD (where M=K or Na) may also be used in the agricultural or horticultural industries to exchange ammonium ion onto a stable substrate (e.g. to form $NH_4$-ASD) for later easy removal, or subsequent use.

Other uses of the ammonium-exchange capacity of ASDs such as extraction of ammonium ion from industrial effluent or from waste products are readily envisaged by those skilled in the art.

While not wishing to be bound by theory, the chemical transformation or conversion of a long range order to a short range ordered structure as described above may be represented by the following example in which montmorillonite, with Al and Si in octahedral and tetrahedral sites in the structure, respectively, is reacted with an alkali metal halide where the cation is $K^+$ or an ammonium ion in an aqueous solution such that excess halide (e.g. $X^-$) is readily exchangeable with the available hydroxyl groups ($OH^-$) in the montmorillonite structure. This exchange results in the formation of a highly basic solution with higher concentration of $OH^-$ ions compared with hydrogen ions which can cause rearrangement of octahedrally coordinated aluminium through the action of these $OH^-$ ions on hydrogen-bonded oxygen atoms. This rearrangement of aluminium co-ordination results in primarily tetrahedrally co-ordinated aluminium in this resultant stable material.

The reaction rate and preferred forms of these aluminosilicate derivatives with desirable properties will be dependent on the precise temperature of reaction for a given period of time. In general, temperatures less than 200° C. may be used and more preferably temperatures are utilized between 50–200° C. A suitable reaction time may be between one minute and 100 hours and more preferably a reaction time of less than 24 hours is utilized. In concert with this rearrangement of co-ordination of the aluminium atom(s), the presence of an additional cation (from the reagent) causes the disordered structure to be stabilised through "attachment" of the cation to an exchange site so formed by this rearrangement. During the overall chemical transformation, loss of aluminium (as well as minor amounts or silicon) from the alumino-silicate structure to the highly basic solution may occur. The preferred pH of this highly basic solution, during and near the end of the reaction, is generally >12, although reaction to form the preferred ASD may occur for solutions with pH >7.0.

As noted above, M-ASD may be produced by a number of similar processes which involve the following generic modifications to the parent mineral structure:

attack by the reactant anion (e.g. $F^-$, $Cl^-$) or cation (e.g. $K^+$, $Na^+$ or $Li^+$) so that a proportion of the Al—O and/or Si—O bonds within the mineral structure are weakened or broken;

loss of long-range periodicity (sometimes referred to as "crystallinity") in the mineral structure so that the derivative material resembles the original structure only as a disordered (short-range ordered) array of sub-units (e.g. $SiO_4$ tetrahedra; $AlO_4$ tetrahedra and newly-formed "exchange sites" which may or may not contain a cation);

loss of a proportion of aluminium atoms (and/or a lesser amount of silicon atoms) from the original parent mineral(s);

addition of the reactant cation (e.g. $Na^+$ or $K^+$) as well as a smaller proportion of the reactant anion (e.g. $F^-$ or $Ca^-$) to the derivative material structure.

The following generic modifications to bulk physical properties also occur with progress of any of these processes for the formation of an M-ASD:

the reaction proceeds with an increase in the viscosity of the reaction mixture to a certain maximum level—determined by the relative proportions and nature of the initial reactants;

an increase in the "dispersability" of individual particles formed during the reaction process—this is assumed due, in part, to a reduction in size of the individual alumino-silicate particles—) compared with the dispersability and/or size of the original starting mineral;

an increase in the bulk volume occupied by a dried powder (i.e. a "fluffy" or less-compact powder) compared with the volume occupied by the original starting mineral.

Various combinations of reactant concentrations, along with some product properties, are given in Table 1. In all these combinations, water is added to the reaction mix in various amounts. In Table 1, CEC for ammonium exchange using the method in Example 4, relative $Cu^{+2}$ exchange (Example 3) and BET surface area of derivatives of STx-1 and SWy-1 are provided. Comparison data for the starting 2:1 clay minerals are also given in Table 1. Chemical compositions for derivatives of STx-1 and SWy-1 are given in Table 2.

Specific examples of the formation of alumino-silicate derivatives are given below.

EXAMPLES

Figure 3:
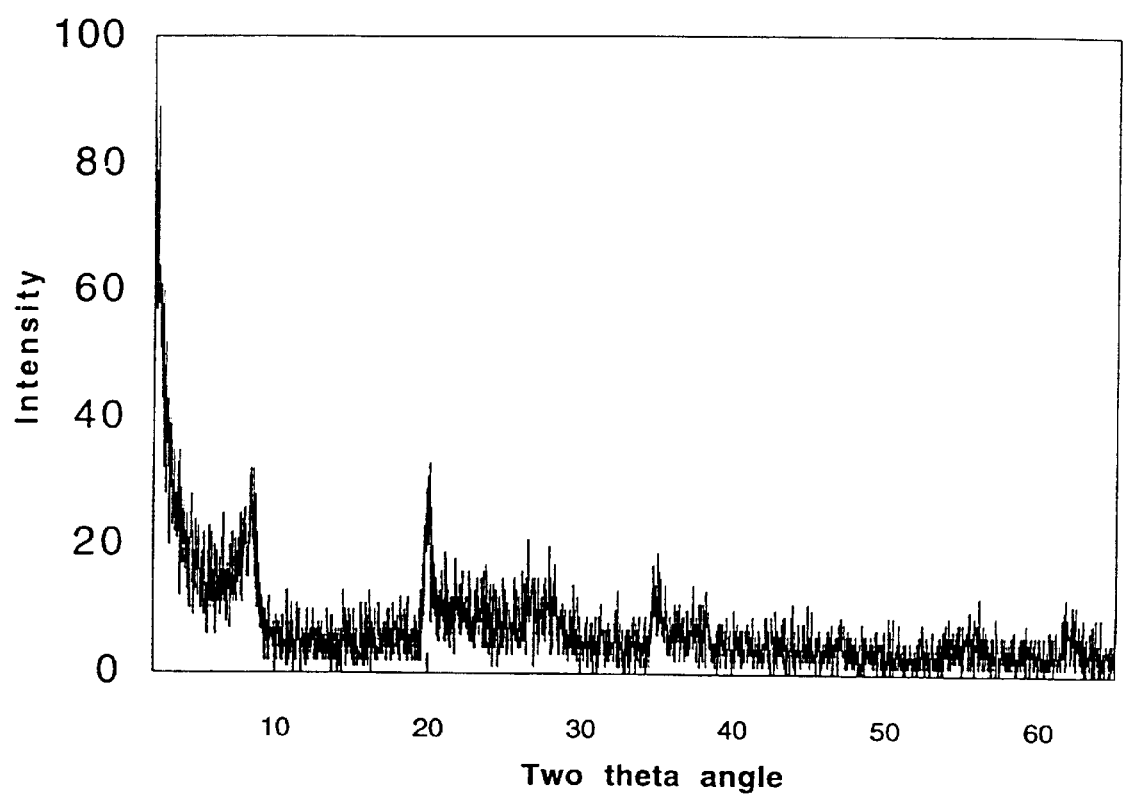
FIG. 3 Powder XRD trace for product obtained by reaction of Ca-montmorillonite with KF (Sample No. STx-6 in Table 1).

Example 1
Formation of M-ASD Via Reaction of Ca-montmorillonite with Metal Halide 10 g of Source Clay montmorillonite from Texas (Sample No. STx-1; van Olphen and Fripiat, 1979, Data handbook for clay materials and other non-metallic minerals, Pergamon Press, Oxford, 342pp.) is thoroughly mixed with 50 g of potassium fluoride (KF) and 20 mls of distilled water in a beaker and heated at 80° C. for five hours. The resulting slurry is washed with water until any excess potassium fluoride is removed. The powder is then dried and subjected to a series of characterisation tests which include powder X-ray diffraction (FIG. 3), $NH_4^+/Cu^{+2}$ exchange and BET surface area measurements. Data from these characterisation techniques indicate that the material has an atomic arrangement (i.e. crystallographic features) as defined above.

Figure 4:
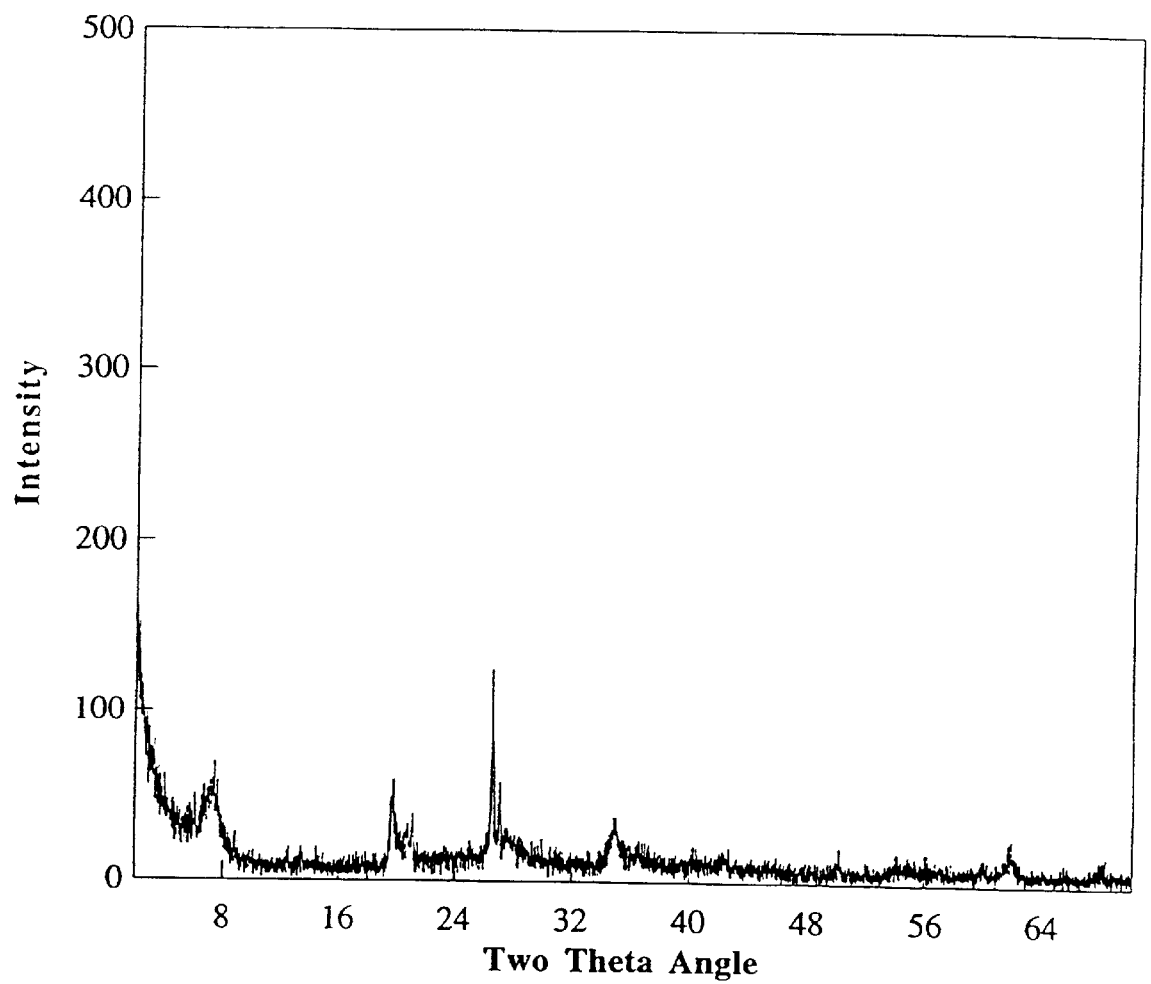
FIG. 4 Powder XRD trace for product obtained by reaction of Na-montmorillonite with KF (Sample No. SWy-4 in Table 1).

Example 2
Formation of M-ASD from Na-montmorillonite Clay 20 g of Source Clay montmorillonite from Wyoming (Sample No. SWy-1; van Olphen and Fripiat, 1979, Data handbook for clay materials and other non-metallic minerals, Pergamon Press Oxford, 342pp.) is thoroughly mixed with 60 g of potassium fluoride (KF) and 50 mls of distilled water in a beaker and heated at 80° C. for five hours. The resulting slurry is washed with water until any excess potassium fluride is removed. The powder is then dried and subjected to a series of characterisation tests which include powder X-ray diffraction (FIG. 4), cation exchange (for $Cu^{+2}$ and $NH_4^+$ following Examples 3 and 4 below) and BET surface area measurements. Data from these characterisation techniques indicate that the material has an atomic arrangement (i.e. crystallographic features) as defined above. The BET surface area and CEC ($NH_4^+$) values for M-ASD formed by this method are 97 $m^2/g$ and 108 meq/100 g, respectively. For uptake of $Cu^{+2}$ cations, M-ASD formed by this method extracted, after a period of 16 hours at room temperature, 106 ppm of Cu are taken from a 200 ppm solution prepared via the method described in Example 3.

Example 3
Uptake of $Cu^{+2}$ from an Aqueous Solution using M-ASD and Formation of $M_c$-ASD 75 mg of M-ASD, obtained by the general process defined in Examples 1 and 2, is placed in a 0.1 M $NaNO_3$ solution containing 200 ppm $Cu^{+2}$ at pH ~5.6 and shaken overnight for a period of approximately sixteen hours and held at room temperature (~25° C.) during this time. The sample was centrifuged and an aliquot of the supernatant solution was analysed for remaining $Cu^{+2}$. In this experiment, the concentration of $Cu^{+2}$ remaining in the aqueous solution is 52.8 $\mu g/ml$ (or 52.8 ppm). This result indicates that, in this specific case, the M-ASD produced by the process described in Examples 1 and 2 will remove 74% of the $Cu^{+2}$ cations in a 200 ppm $Cu^{+2}$ solution in a period of approximately 16 hours. This example presents one method used for assessing the relative capacity of these new materials for exchange of $Cu^{+2}$ cations.

Table 1 lists, for various classes of processing conditions used in these reactions, the proportion of $Cu^{+2}$ removed from a standard solution by a defined amount of M-ASD under the above standard conditions. Entries in this table which do not designate reaction conditions, the $Cu^{+2}$ exchange data refer to the capacity of the original starting material (e.g. montmorillonite STx-1) for exchange of $Cu^{+2}$ ions. Values for remaining $Cu^{+2}$ which are less than 100 $\mu g/ml$ are reasonably considered commercially-viable materials for the exchange of divalent cations. In general, this tabulation of $CU^{+2}$ exchange capacity is considered a guide to the relative exchange capacity for each M-ASD for a wide range of cations including $Al^{+3}$, $Mg^{+2}$, $Ca^{+2}$, $Fe^{+2}$, $Cr^{+3}$, $Mn^{+2}$, $Ni^{+2}$, $Co^{+2}$, $Ag^+$, $Zn^{+2}$, $Sr^{+2}$, $Nd^{+3}$, $Hg^{+2}$, $Cd^{+2}$, $Pb^{+2}$ and $UO_2^{+2}$.

The material formed upon exchange with $Cu^{+2}$, designated Cu-ASD, is itself a new material which has similar structural properties to the generically-designated M-ASD except for the replacement of K (and/or Na) on the exchange site with Cu. This material has high surface area values, in some cases, considerably higher than that recorded for the original M-ASD material before $Cu^{+2}$ exchange.

Example 4
Exchange of $NH_4^+$ from an Aqueous Solution using M-ASD and Formation of $M_c$-ASD. Determination of CEC for Various Cations (e.g. $Na^+$ and $LI^+$).

0.5 g of M-ASD formed by modification of clay minerals using the methods noted above is placed in a centrifuge bottle and 30 ml of 1 M $NH_4Cl$ is added and allowed to equilibrate overnight. The sample is centrifuged and the supernatant is removed. A fresh amount of 30 ml 1 M $NH_4Cl$ is added and the sample is shaken for 2 hours. This procedure of centrifuging, removal of supernatant and addition of 30 ml 1 M $NH_4Cl$ is repeated three times. Any entrained $NH_4Cl$ is removed by washing with ethanol. At this point, the remaining material is an exchanged ASD, such as $NH_4$ASD. To determine a CEC value for the specific M-ASD material, a further 30 ml of 1 M $NH_4Cl$ is added to the washed sample and allowed to equilibrate overnight. The supernatant is then collected after centrifugation and a further 30 ml of 1 M KCl solution is added and shaken for two hours. This procedure of centrifuging, removal of supernatant and addition of KCl is repeated three times. Finally, distilled water is added to make up 100 ml of solution and the amount of $NH_4^+$ present is measured by ion-selective electrode. This procedure follows that given by Miller et al., 1975, Soil Sci. Amer. Proc. 39 372–373, for the determination of cation exchange capacity and similar procedures are used for CEC determination for other cations such as $Na^+$ and $Li^+$. All CEC values tabulated for a range of M-ASDs have been determined by this basic procedure. The results of these experiments are expressed in milli-equivalents of $NH_4^+$ exchanged per gram and are listed in Table 1.

TABLE 1

Summary of Process Conditions and Product (M-ASD) properties

| Sample No. | Materials | Ratio | Temp. (° C.) | Time (hrs) | Cu* ppm | Surface Area $m^2/g$ | CEC (meq/ 100 g) |
|---|---|---|---|---|---|---|---|
| STx-1 | Raw material | | | | 163.6 | 84 | 60 |
| STx-4 | STx-1:KF:H2O | 20:60:50 | 80 | 3 | 44 | 128 | 132 |
| STx-5 | STx-1:KF:H2O | 20:80:60 | 80 | 3 | | 78 | 80 |
| STx-6 | STx-1:KF:H2O | 10:50:20 | 80 | 5 | | 66 | 80 |
| SWy-1 | Raw material | | | | 147.5 | 32 | 96 |

TABLE 1-continued

Summary of Process Conditions and Product (M-ASD) properties

| Sample No. | Materials | Ratio | Temp. (° C.) | Time (hrs) | Cu* ppm | Surface Area m²/g | CEC (meq/100 g) |
|---|---|---|---|---|---|---|---|
| SWy-4 | SWy-1:KF:H2O | 20:60:50 | 80 | 3 | 94 | 97 | 108 |

TABLE 2

Averaged microprobe analyses for derivatives of montmorillonites

| Element wt % oxide | STx-1 Derivative | SWy-1 Derivative |
|---|---|---|
| $Na_2O$ | 0.03 | 1.20 |
| $K_2O$ | 10.47 | 6.72 |
| MgO | 5.07 | 4.36 |
| CaO | 2.47 | 1.35 |
| $Al_2O_3$ | 20.36 | 19.81 |
| $SiO_2$ | 49.72 | 48.28 |
| $Fe_2O_3$ | 0.84 | 4.72 |
| Total | 88.96 | 89.44 |

LEGENDS

TABLES

* Cu concentration in ppm remaining in solution from an initial value of 200 ppm. See Example 3.

What is claimed is:

1. A 2:1 clay mineral derivative comprising:
   (a) an amorphous X-ray diffraction signal manifest as a broad hump using X-ray powder diffraction between 22° and 32° 2θ using CuKα radiation; and
   (b) the presence of primarily tetrahedrally co-ordinated aluminium.

2. A 2:1 clay mineral derivative as claimed in claim 1 having a composition which is consistent with the general formula $M_pAl_qSi_2$ or $(OH)_5X_1 \cdot uH_2O$ wherein M is ammonium ion or alkali metal cation and X is halide wherein $0.2 \leq p \leq 2.0$, $0.5 \leq q \leq 2.5$, $4.0 \leq r \leq 12$, $0.5 \leq s \leq 4.0$, $0.0 \leq t \leq 1.0$ and $0.0 \leq u \leq 6.0$.

3. A 2:1 clay mineral derivative as claimed in claim 2 wherein M is selected from the group consisting of $NH_4^+$, $Na^+$, $K^+$, $Li^+$, $Rb^+$ and $Cs^+$, and is at least partly exchanged by one of the following:

$Mg^{2+}$, $Ca^{2+}$, $Sr^{2+}$, $Ba^{2+}$, $Cr^{3+}$, $Mn^{2+}$, $Co^{2+}$, $Ni^{2+}$, $Cu^{2+}$, $Zn^{2+}$, $Ag^+$, $Pb^{2+}$, $Cd^{2+}$, $Hg^{2+}$, $La^{3+}$, $Nd^{3+}$ and $UO_2^{2+}$.

4. A 2:1 clay mineral derivative as claimed in claim 3 wherein at least one of $NH_4^+$, $Na^+$, $K^+$, $Li^+$, $Rb^+$ $Cs^+$ is at least partly exchanged by one of $Pb^{2+}$, $Cu^{2+}$, $Cd^{2+}$, $Ni^{2+}$, $Co^{2+}$, $Cr^{3+}$, $Sr^{2+}$, $Zn^{2+}$, $Nd^{3+}$ and $UO_2^{2+}$.

5. A 2:1 clay mineral derivative as claimed in claim 1 having a cation exchange capacity of 20–900 milli-equivalents per 100 g as measured by exchange of ammonium or metal cations from an aqueous solution.

6. A 2:1 clay mineral derivative as claimed in claim 5 having a cation exchange capacity as measured by exchange of ammonium of about 300 milli-equivalents per 100 g.

7. A 2:1 clay mineral derivative as claimed in claim 1 having a surface area less than 400 m²/g as measured by the BET isotherm.

8. A 2:1 clay mineral derivative as claimed in claim 7 wherein the BET surface area is between 25–200 m²/g.

9. A process for the preparation of a 2:1 layer clay mineral derivative in accordance with claim 1, which process includes the step of reacting a solid 2:1 layer clay mineral with a molar excess of compound MX wherein M is alkali metal or ammonium ion and X is halide.

10. A process as claimed in claim 9 wherein the clay mineral is selected from montmorillonite, illite, palygorskite or saponite.

11. A process as claimed in claim 9 wherein a reaction temperature of 200° C. or less is utilized.

12. A process as claimed in claim 11 wherein a reaction temperature of between 50–200° C. is utilized.

13. A process as claimed in claim 12 wherein a reaction time of less than 24 hours is utilized.

14. A process as claimed in claim 9 wherein a reaction time of one minute to 100 hours is utilized.

* * * * *